(12) United States Patent
Truffert et al.

(10) Patent No.: US 7,908,085 B2
(45) Date of Patent: Mar. 15, 2011

(54) METHOD FOR ACQUIRING AND PROCESSING MAGNETOMETRIC DATA BY LOCAL UPDATES IN REAL TIME

(75) Inventors: Catherine Truffert, Orleans (FR); Didier Charlot, Roscoff (FR); Xavier Lalanne, Melun (FR)

(73) Assignee: Ixsea, Marly-le-Roi (FR)

( * ) Notice: Subject to any disclaimer, the term of this patent is extended or adjusted under 35 U.S.C. 154(b) by 364 days.

(21) Appl. No.: 11/988,505

(22) PCT Filed: Jul. 11, 2006

(86) PCT No.: PCT/FR2006/050705
§ 371 (c)(1),
(2), (4) Date: Jan. 9, 2008

(87) PCT Pub. No.: WO2007/007008
PCT Pub. Date: Jan. 18, 2007

(65) Prior Publication Data
US 2009/0265109 A1    Oct. 22, 2009

(30) Foreign Application Priority Data
Jul. 12, 2005   (FR) ..................... 05 52167

(51) Int. Cl.
*G01V 3/38* (2006.01)
(52) U.S. Cl. ..................................... 702/5
(58) Field of Classification Search .......... 702/5, 11, 702/13
See application file for complete search history.

(56) References Cited

U.S. PATENT DOCUMENTS

| | | | |
|---|---|---|---|
| 5,544,052 A * | 8/1996 | Fujita et al. | 702/5 |
| 5,839,090 A * | 11/1998 | Zoraster | 702/5 |
| 6,608,942 B1 * | 8/2003 | Le | 382/279 |
| 6,937,765 B2 * | 8/2005 | Skourikhine et al. | 382/199 |

OTHER PUBLICATIONS

Roest, W., J. Verhoef and M. Pilkington, "Magnetic interpretation of the 3-D analytic signal", Geophysics, vol. 57, No. 1, 116-125 (1992).*
Smith, B.D., Abraham, J.A., Cannia, J.C., Steele, G.V., and Hill, P.L., 2007, Helicopter Electromagnetic and Magnetic Geophysical Survey Data, Oakland, Ashland, and Firth Study Areas, Eastern Nebraska, Mar. 2007: U.S. Geological Survey Open-File Report 2008-1018, 1.0. p. 1-13.*

(Continued)

*Primary Examiner* — Tung S Lau
(74) *Attorney, Agent, or Firm* — Young & Thompson

(57) ABSTRACT

The invention concerns a method for acquiring and processing magnetometric data for representing on an at least two-dimensional map magnetometric characteristics of a geographical zone including a step of measuring the intensity of a magnetic field (1) on a geographical zone producing a set of magnetometric data of intensity B(s), a step of computing 2D interpolation (3), a step of computing reduction at the poles (5) and a step of computing an analytical signal (7). The invention is characterized in that it includes sectioning the map of magnetic disturbances into a matrix of pixels, a step of locally updating in real time the map of magnetic anomalies, a step of locally updating in real time the map of 2D interpolation by applying the 2D interpolation calculation in the neighborhood of the updated pixel, a step of locally updating in real time the 2D map of reduction at the poles and a step of locally updating in real time the 2D map of the analytical signal.

20 Claims, 11 Drawing Sheets
(8 of 11 Drawing Sheet(s) Filed in Color)

OTHER PUBLICATIONS

Resolve Survey for U.S. Geological Survey, Oakland, Ashland, and Firth Area, In: Smith, B.D., Abraham, J.A., Cannia, J.C., Steele, G.V., and Hill, P.L., 2007, Helicopter Electromagnetic and Magnetic Geophysical Survey Data, Oakland, Ashland, and Firth Study Areas, Eastern Nebraska, Mar. 2007: U.S. Geological Survey Open-File Report 2008-1018, 1.0.*

Lu R.S., Mariano J. Willen D.E.:, "Differential Reduction of Magnetic Anomalies to the Pole on a Massively Parallel Computer", Geophysics, Seg, vol. 68. No. Nov. 2003, Dec. 2003 p. 1945-1951 XP002372654 p. 1948 p. 1950.

Keating P., Zerbo L.:, An Improved Technique for Reduction to the Pole At Low Latitudes, Geophysics, Seg, vol. 61, No. 1 Jan. 1996, Feb. 1996 pp. 131-137, XP002372655 p. 132 p. 134.

Arkani-Hamed J., Urquhart W.E.S.:, Reduction to the Pole of the North American Magnetic Anomalies< Geophysics, Seg, vol. 55, No. 2, Feb. 1990, pp. 218-225, XP002372656 p. 218 p. 220.

Smith W.H.F., Wessel P,:, Gridding With Coninuous Curvature Splines in Tension, Geophysics, Seg, vol. 55, No. 3, Mar. 1990, pp. 293-305, XP002372657 Cite Dans La Demande Le Document En Entier.

\* cited by examiner

PREVIOUS ART

PREVIOUS ART

PREVIOUS ART

METHOD FOR ACQUIRING AND PROCESSING MAGNETOMETRIC DATA BY LOCAL UPDATES IN REAL TIME

The invention relates to a method for acquiring and processing magnetometric data by local and real-time updating operations on a map with at least two-dimensional representation of magnetometric features of a geographic area.

The survey campaigns of magnetometric data conducted at sea enable to detect magnetic anomalies such as, for instance, those generated by mines or containers.

These magnetometric data surveys are obtained from a boat by magnetometric sensors (Applied geophysics: Magnetism, Course notes, Michel Chouteau, Ecole Polytechnique de Montreal, 2002).

The current method consists in measuring a complete set de magnetometric data along a trajectory traveled by the boat over a geographic area.

When the survey campaign is ended and regardless whether the boat is still at sea, or brought back to the port, different data processing steps are applied to the complete set de magnetometric data. This processing method is called "global" (multiscale analysis and reversal of geophysical data, French Guyana, Pascal Sailhac (IPGP, France, 1999).

The complete set of magnetometric data is interpolated in advance on a 2D interpolation map. This first processing step enables to reconstruct the surface of the geographic area from the line corresponding to the trajectory of the boat (Spatial assessment and interpolation: Deterministic methods and geostatistic methods, Michel Arnaud and Xavier Emery, Hermes Science publications, Paris, 2000; Gridding of Geophysical Potential Fields from Noisy Scattered Data, Michael Rauth, Meteorology and geophysics institute of Vienna University, Thesis, 1998).

A second processing step is applied to the data of the 2D interpolation map so as to be able to exploit such data.

Two distinct processing processes are possible. They enable to compensate for the influence of the terrestrial field on the shape of the magnetic anomaly. They enable to observe the actual shape of the magnetic anomalies (applied geophysics Magnetism, Course notes, Michel Chouteau, Ecole Polytechnique de Montreal, 2002).

The first processing method is called reduction to the poles. The second is called calculation of the analytical signal. In both cases a map is obtained with at least two dimensions (2D) represented in the plane (x, y), corresponding to the surface of the geographic area.

These methods are applied to the complete set of magnetometric data when the acquisition step is completed and the boat is back to the port.

It may happen that the 2D maps are incomplete and that they exhibit "holes" after data processing or that areas of potential interest prove a little too far from the trajectory of the boat to produce a relatively accurate map.

In such a case, if the user wishes to complete such data, the boat needs to go back to sea to complete its survey at the locations considered. This may represent several ten or hundred kilometres to travel again, a considerable additional measuring time and extra cost.

The object of the present invention is hence to offer a method for acquiring and processing magnetometric data the enabling representation, on one at least two-dimensional map, of magnetic features in real time by local updates on small data samples.

In this view, the invention relates to a method for acquiring and processing magnetometric data for at least two-dimensional map representation of magnetometric features of a geographic area including:

a step of measuring the intensity of the magnetic field on a geographic area producing a set of intensity magnetometric data B(s) forming a map of magnetic anomalies, s representing the curvilinear abscissa along the trajectory of the survey, a step of 2D-interpolation calculation applied to the set of intensity magnetometric data B(s) producing a set of intensity magnetometric data B(x,y) referred to according to the referentials x and y on a 2D interpolation map, a step of calculating the reduction to the poles applied to the set of interpolated intensity magnetometric data B(x,y) producing a set of magnetometric data reduced to the poles B'(x,y) represented on a 2D reduction map to the poles, a step of calculating the analytical signal applied to the set of interpolated intensity magnetometric data B(x,y) producing a set of analytical magnetometric data B''(x,y) represented on a 2D map of the analytical signal.

According to the invention, this method comprises:

gridding the map of magnetic anomalies into a matrix of pixels, a step of local and real-time updating of the map of magnetic anomalies by a step of elementary measuring the intensity of the magnetic field on a reduced geographic area producing an elementary series of magnetometric data associated with an updated pixel, a step of local and real-time updating of the 2D interpolation map by applying the 2D interpolation calculation 2D of the updated pixel, producing pixels on an updated 2D interpolation map, the acquisition and processing method includes a step of local and real-time updating of the 2D reduction map to the poles by applying to the updated 2D interpolation map the reduction calculation to the poles for the updated pixel and in the vicinity of said updated pixel, producing pixels on an updated map of magnetometric data reduced to the poles, the acquisition and processing method includes a step of local and real-time updating of the 2D map of the analytical signal by applying to the updated 2D interpolation map the calculation of the analytical signal for the updated pixel and in the vicinity of said updated pixel, producing pixels on an updated map of analytical magnetometric data.

In different possible embodiments, the present invention also relates to the features which will appear in the following description and which should be considered individually or in all their technically possible combinations;

the step of local and real-time updating of the 2D interpolation map comprises a calculation of minimal curvature type, the step of local and real-time updating of the 2D pole reduction map comprises a step of applying a convolution mask in the spatial domain;

the step of local and real-time updating of the 2D map of the analytical signal comprises:

a step of applying a convolution mask of gradient X in the spatial domain producing a filtered sub-image according to the referential X, a step of applying a convolution mask of gradient Y in the spatial domain producing a filtered sub-image according to the referential Y, a step of applying a convolution mask of gradient Z in the spatial domain producing a filtered sub-image according to the referential Z, a step of compounding filtered sub-images according to the referentials X, Y and Z, the method for acquiring and processing magnetometric data includes a step of extracting a sub-set to be treated of the updated 2D interpolation map, the sub-set to be treated comprising the updated pixel and the vicinity of said updated pixel, the steps of local and real-time updating of the 2D reduction map to the poles and of the 2D map of the analytical signal are applied solely to the sub-set to be treated, the step of local and real-time updating of the 2D reduction map to the poles includes a multiplying operation by a complex filter applied in the Fourier domain to the sub-set to be treated generating a treated sub-set, the step of local and real-time updating of the 2D map of the analytical signal comprises a multiplying operation by a gradient filter X, a multiplying operation by a gradient filter Y, a multiplying operation by a gradient filter Z applied in the Fourier domain to the sub-set to be treated, wherein each operation is applied solely so as to provide three maps, one of gradient X, another of gradient Y, and the third of gradient Z, the three maps are compounded so as to generate a single treated sub-set, the steps of local and real-time updating of the 2D reduction map to the poles and of the 2D map of the analytical signal include a step of re-combining the treated sub-set with the remainder of the sub-sets, a Euler deconvolution is applied, locally and in real time, to the updated pixel and in the vicinity of said updated pixel on the updated 2D map of the analytical signal so as to enable referencing of the magnetic sources according to the referential z, a Euler deconvolution is applied, locally and in real time, to the updated pixel and in the vicinity of said updated pixel on the updated 2D map of the analytical signal so as to enable the calculation of the index of the magnetic sources generating the pixels of analytical magnetometric data.

The invention also relates to a device for acquiring and processing magnetometric data for the production of a map with at least two-dimensional representation of magnetometric features of a geographic area including comprising a means for measuring magnetometric data producing a signal forming a map of magnetic anomalies, a unit for processing said signal producing a 2D map of reduction to the poles and a 2D map of the analytical signal.

According to the invention, the processing unit implements, locally and in real time, the method described above.

In different possible embodiments, the present invention also relates to the features which will appear in the following description and which should be considered individually or in all their technically possible combinations:

the means for measuring magnetometric data includes at least one scalar magnetometric sensor, the means for measuring magnetometric data is a vectorial magnetometric sensor capable of generating vectorial magnetometric data Bx(s), By(s) and Bz(s), Bx(s), By(s) and Bz(s) being the three components of the magnetic field B(s), the means for measuring magnetometric data is a gradiometer capable of generating gradient data of at least one of the components of the gradient tensor of the field Gx or Gy or Gz, the means for measuring magnetometric data is a gradiometer capable of generating gradient data of at least one of the components of the gradient tensor of the field Gx or Gy or Gz and intensity magnetometric data B(s), the means for measuring magnetometric data is a gradiometer capable of generating gradient data of at least one of the components of the gradient tensor of the field Gx or Gy or Gz and vectorial magnetometric data Bx(s), By(s) and Bz(s).

The patent or application file contains at least one drawing executed in color. Copies of this patent or patent application publication with color drawing(s) will be provided by the Office upon request and payment of the necessary fee.

The invention will be described more in detail with reference to the appended drawings wherein:

FIG. 1 is a diagrammatic representation of a method for acquiring and processing magnetometric data according to the previous art.

Figure 1:
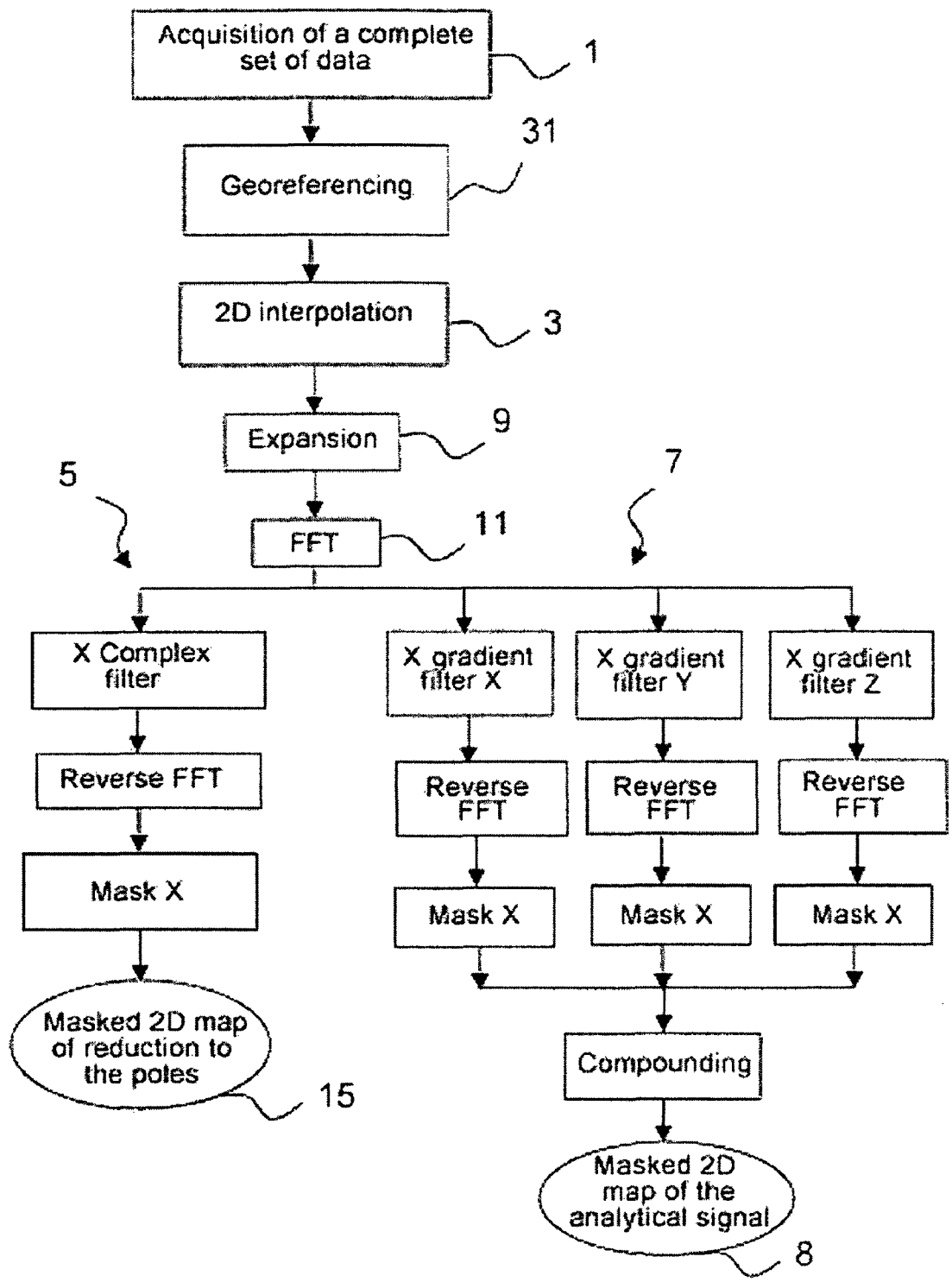
FIG. 1 is a diagrammatic representation of the method for acquiring and processing magnetometric data according to the previous art.

This method enables to obtain a representation on one at least two-dimensional map of magnetometric features of a geographic area.

It includes a step of measuring the intensity of the magnetic field 1 on a geographic area.

This measuring step 1 product a set of intensity magnetometric data B(s) enabling to form a map of georeferenced magnetic anomalies 2 (s represents the curvilinear abscissa along the trajectory of the data survey). The geographical position of each measurement may be obtained by GPS or by other positioning means.

This acquisition method is so-called "global" since the complete set of magnetometric data is obtained after the acquisition step 1.

It is this complete set which will be treated for obtaining the 2D maps.

A step of 2D-interpolation calculation 3, (represented on FIG. 2 A), is then applied to the set of intensity magnetometric data B(s).

Among the multitude of existing 2D interpolation calculation techniques, the so-called "minimal curvature" method is the one used most currently for the processing of the potential data (Magnetic, Gravimetry).

Its principle has been presented by Briggs in 1974, (Briggs, I. C., 1974, Machine contouring using minimum curvature: *Geophysics:* 39, 39-48). When considering a series of measurements, the 2D surface sought is the one for which the square of the total curvature of the surface running through the measuring points is minimum.

This 2D interpolation method is efficient for surfaces which do not exhibit any abrupt variations.

Nevertheless, it may exhibit important undulations on the edges.

A more regular solution is obtained with the Smith and Wessel method (1990) (Smith, W. H. F. and Wessel, P., 1990, Gridding with continuous curvature splines in tension: *Geophysics:* 55, 293-305). The solution obtained exhibits weaker variations in curvature.

From this method, two variations are possible. The first one is called "resolution of a system of linear equations" (Wessel P. D. and Bercovici, 1998, Gridding with Splines in Tension: A Green function Approach, Math. Geol., 30, 77-93) and the second "finite difference resolution" (Smith W. H. F. and Wessel P., 1990, Gridding with continuous curvature splines in tension: *Geophysics:* 55, 293-305).

The method by resolution of a system of linear equations is well suited when the number of data to be treated is small and when the extent of the surface to be interpolated is large.

Conversely, the method by finite difference is better suited when the number of data to be treated is large and when the extent of the surface to be interpolated is large. At the beginning of iterations, high spatial frequencies can be obtained. It is these frequencies which become accessible for the following processing steps. The lowest frequencies are obtained eventually if the calculation time is reasonable.

After the 2D interpolation calculation 3 by either methods, there is provided a set of interpolated intensity magnetometric data B(x,y), referred to according to the referentials x and y on a 2D interpolation map 4. The set of the interpolated magnetometric data forms a surface. The pitch of the map is 25 m in the example represented on the Figures. It may be different.

Then two distinct data processes may be applied to the set of interpolated magnetometric data producing two distinct 2D maps. Both these methods consist of Fourier filterings.

Figure 2:
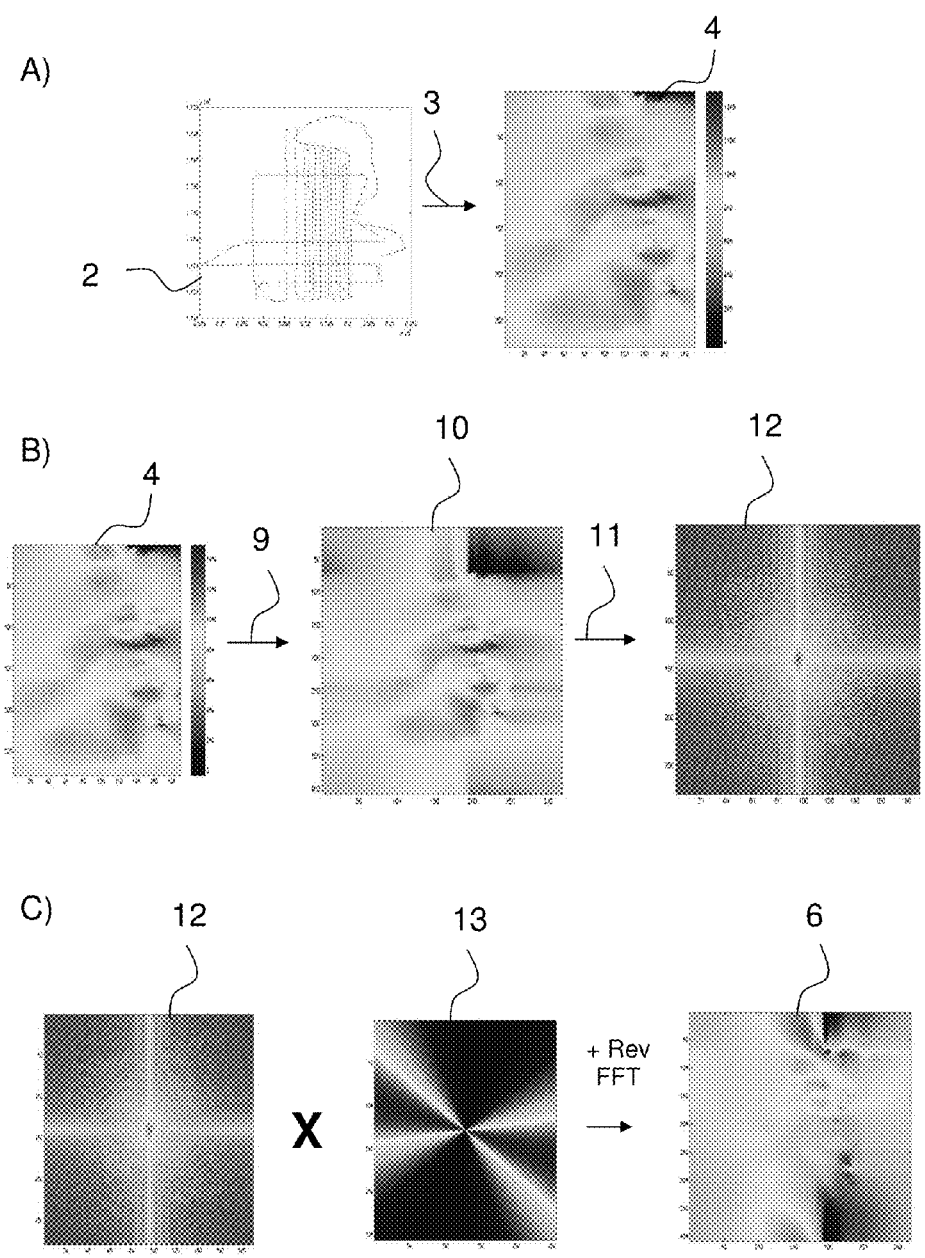
FIG. 2 is a representation of the different steps of a method for processing magnetometric data enabling to provide maps of 2D interpolation and of reduction to the poles according to the previous art.

The first possible processing method, represented on FIG. 2 C), consists in applying a calculation of reduction to the poles 5 to the set of interpolated intensity magnetometric data B(x,y) and more accurately to spatial frequencies made accessible during the 2D interpolation calculation, as explained above.

Figure 4:
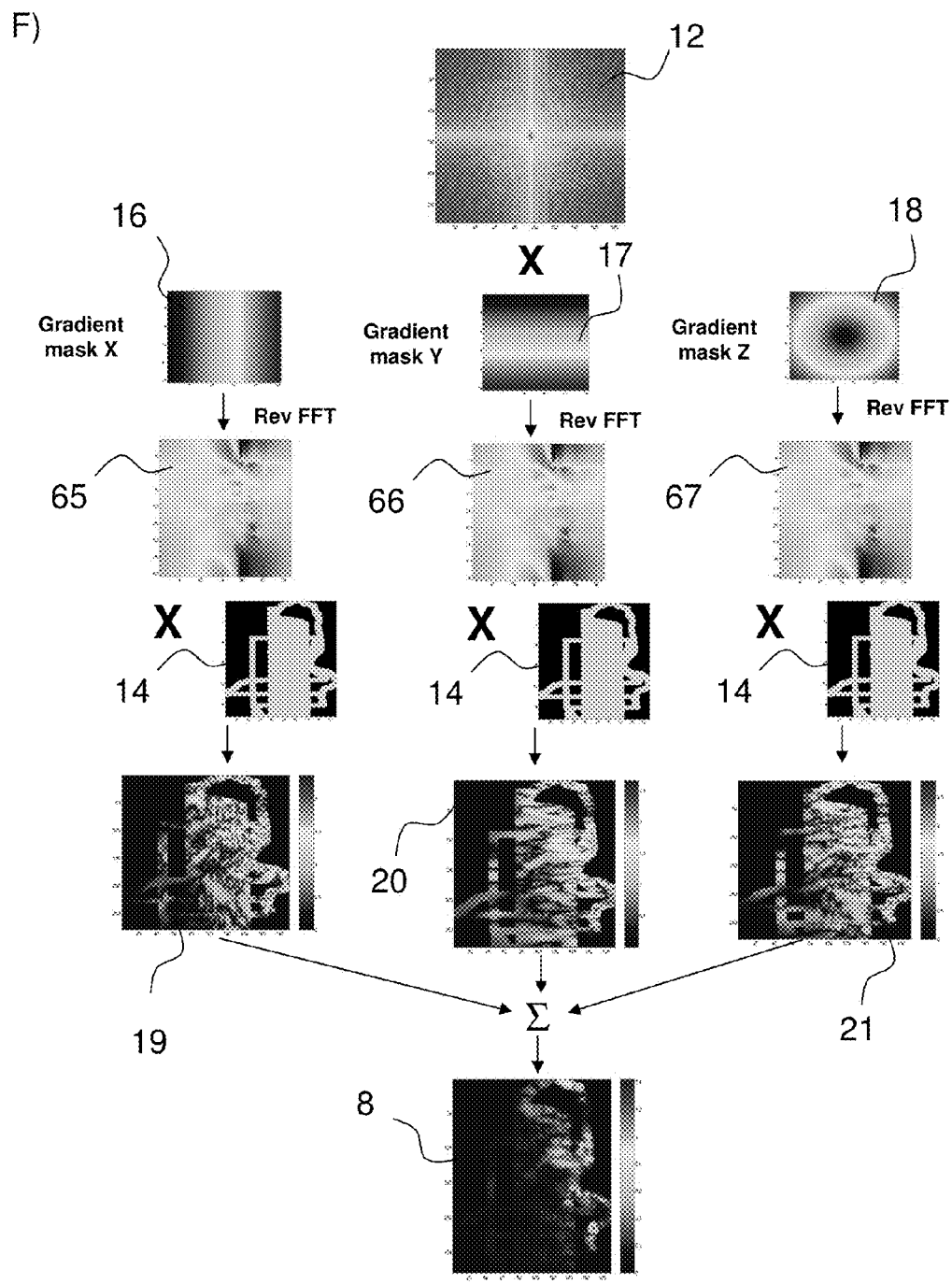
FIG. 4 is a representation of the different steps of a method for processing magnetometric data enabling to provide a 2D map of the analytical signal according to the previous art.

The second processing method, represented on FIG. 4, consists in applying a calculation of the analytical signal 7 to the set of interpolated intensity magnetometric data B(x,y).

Both these processing methods may be performed one without the other.

They require in advance several common calculation operations.

An expansion operation 9 (bilinear interpolation) is applied beforehand to the 2D interpolation map 4 (FIG. 2 B)) which consists in rendering this map periodic and continuous on the edges. This is one of the conditions necessary to the calculation of the Fourier transform below. Another condition was the filling of the "holes" of the map, which was conducted with the 2D interpolation calculation 3.

A calculation of two-dimensional Fourier transform 11 is then applied to the whole extended 2D map 10. A 2D map representing a set of data in the Fourier domain 12 is obtained.

For the calculation of reduction to the poles of the spatial frequencies made accessible 5, this set of data is multiplied by a complex filter 13 in the Fourier domain as shown on FIG. 2 C).

The complex filter 13 is obtained as follows
either B(x,y) representing the set of the magnetic data at an altitude z and FB(kx,ky) its Fourier transform;
or Brtp(x,y) representing the set of the magnetic data reduced to the pole and FBrtp(kx,ky) its Fourier transform;
Theory shows that:

$$FBrtp(kx,ky)=FB(kx,ky)*Frtp(kx,ky) \qquad (eq\ 1)$$

Where Frtp represents the transfer function of the complex filter;

$$Frtp(kx,ky)=1/([\sin(Ip)+i*\cos(Ip)*\sin(\theta+Dp)]*[\sin(Io)+i*\cos(Io)*\sin(\theta+Do)]) \qquad (eq2)$$

With:
Ip,Dp representing the tilt and the declination of the deep field (terrestrial);
Io,Do representing the tilt and the declination of the deep of the anomaly (induced+remanent);
θ representing the angle defined by the wave numbers kx,ky such as θ=a tan(ky/kx);

A calculation of two-dimensional Fourier transform 11 is then applied to the whole extended 2D map 10. A 2D map representing a set of data in the Fourier domain 12 is obtained.

It is considered that the induced field is in the direction of the terrestrial field and the unknown remanent field is neglected. Io=Ic=I and Do=Dc=D is hence obtained. The formula of the equation 2 is not accurate for latitudes lower than 20°. In practice to regulate this formula, sin(Ip) is replaced with sin(Ia) for |Ip|<|Ia|.

Taking these remarks into account, the transfer function of the complex filter 13, according to the formula (eq2), is then written as follows:

$$Frtp(kx,ky)=1/([\sin(Ia)+i*\cos(Ip)*\sin(\theta+Dp)]^2) \qquad (eq3)$$

After multiplying the set of data in the Fourier domain by this complex filter 13 and the application of a two-dimensional reverse Fourier transform, a set of magnetometric data reduced to the poles B'(x,y) is obtained as represented on a 2D map of reduction to the poles 6.

A mask 14 is applied to the 2D map of reduction to the poles 6 so as to mask the zones which have not been actually covered during the measuring campaign. A masked 2D reduction map to the poles 15 is obtained, as shown on FIG. 3 E).

Figure 3:
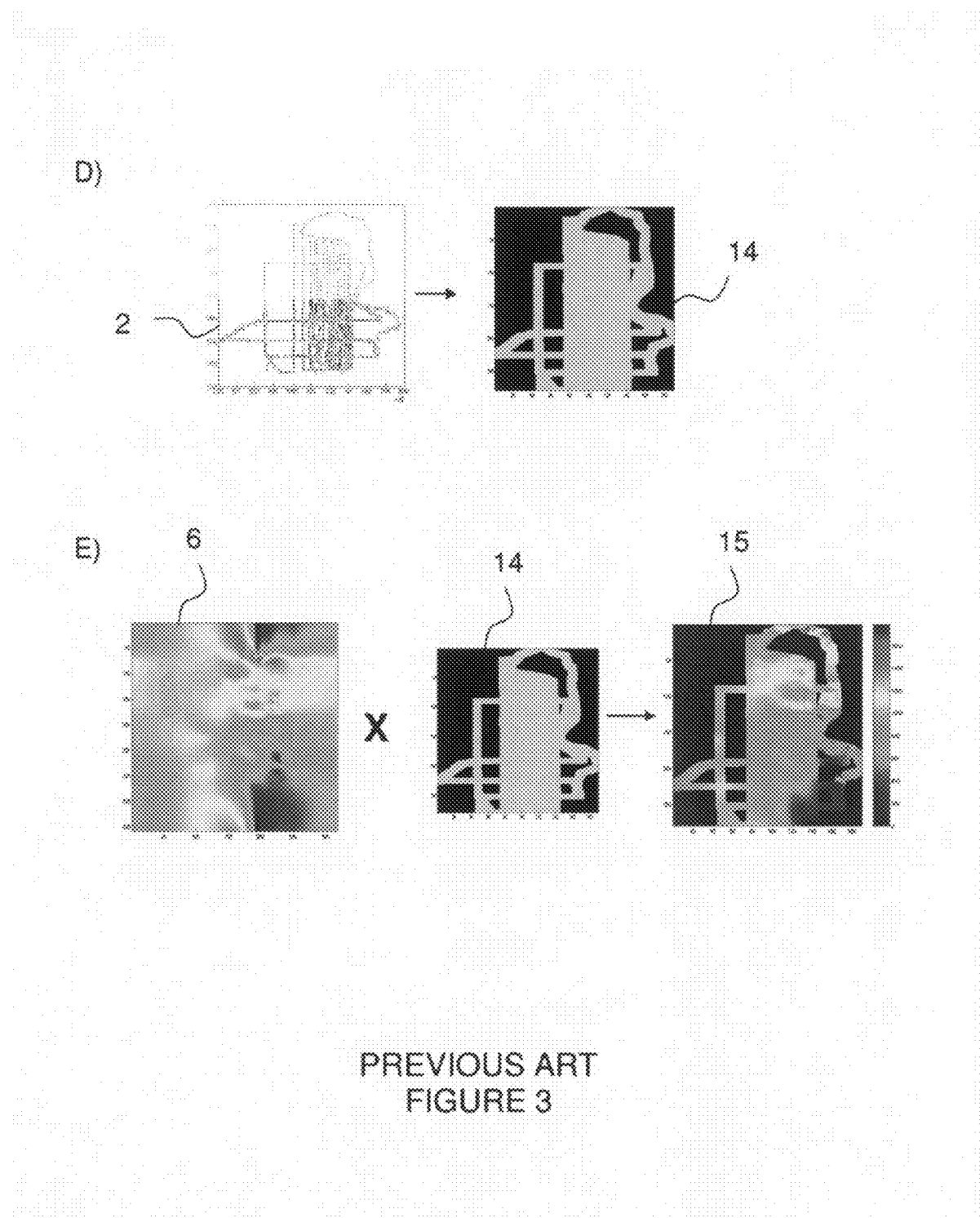
FIG. 3 is a representation of the different steps of a method enabling to provide a masked image according to the previous art.

As represented on FIG. 3 D), the mask 14 is obtained from the complete map of magnetic anomalies 2. The mask is a map composed of 0 and of 1 based on the pitch of the 2D map of reduction to the poles 6 which is 25 m in this example. For each measuring spot situated to the position x,y all the spots of the maps situated at a distance smaller than a maximum radius are set to 1. In this example, the maximum radius is 5 times the pitch of the map i.e. 125 m.

After obtaining the 2D map representing a set of data in the Fourier domain 12, it is also possible to obtain a 2D map of the analytical signal 8 thanks to a step of calculating the analytical signal 7, represented on FIG. 4 F).

This step includes a multiplying operation by the gradient filter X 16, a multiplying operation by a gradient filter Y 17, a multiplying operation by a gradient filter Z 18 applied in the Fourier domain to the whole set of data of the Fourier domain 12, wherein each operation is applied solely so as to provide three maps 65, 66, 67. Each of these three maps 65, 66, 67 is then multiplied by the mask 14 obtained from the complete map of magnetic anomalies 2. Three masked maps are obtained, one of gradient X 19, another of gradient Y 20 and a third of gradient Z 21.

The three maps 19, 20 and 21 are then compounded so as to generate a solely masked 2D map of the analytical signal 8.

The transfer functions in the Fourier domain of the gradient filters are obtained as follows.

The magnetic field measured is a potential field. This field may thus be associated an analytical signal built from these derivates. For instance with the profile, the field may be described by a function $B(x,z)$ in 2 dimensions, with x the coordinate along the profile and z the depth. The derivates $dB/dx$ and $dB/dz$ (dz directed downwards) are conjugate harmonics to one another. They can be deduced from one another by the Hilbert transform. The complex signal $B''(x,z)=dB/dx+i\, dB/dz$ is hence an analytical signal.

From simple models, it can be shown that the module of the analytical signal exhibits maxima vertical to the magnetic sources.

This property extends to 3 dimensions. The field is then expressed by $B(x,y,z)$ and the complex signal by $|B''|=sqrt(Gx^2+Gy^2+Gz^2)$ (composition step), with:

Gx=dB/dx representing the gradient x of the field (2D map gradient X 19);
Gy=dB/dy representing the gradient y of the field (2D map gradient Y 20);
Gz-=dB/dz representing the gradient z of the field (dz<0) (2D map gradient Z 21);

In the Fourier domain, the corresponding transfer functions are:

FGx(kx,ky)=2*pi*i*kx;
FGy(kx,ky)=2*pi*i*ky;
FGz-(kx,ky)=2*pi*sqrt(kx^2+ky^2);

This analytical process consists of a high-pass filter which is hence very noise sensitive. It is possible to apply, beforehand, a low-pass filter. This filtering is provided by an upward prolongation filter Gz+, whose transfer function is FGz+=exp(−dz*k).

According to the invention, the map of georeferenced magnetic anomalies 2 is a georeferenced image, formed of a matrix of elementary pixels. Each pixel is ascribed a single value calculated from the set of measurements situated inside the elementary geographic area represented by the pixel.

The size of a pixel is a choice of the user which depends on the size of the anomalies he wishes to observe, of the calculating power of the central unit as well as the measuring frequency of the magnetometric sensor. The measuring frequency of the sensor used for the acquisition of the maps of FIGS. 1 to 10 is situated around 10 Hz.

Figure 5:
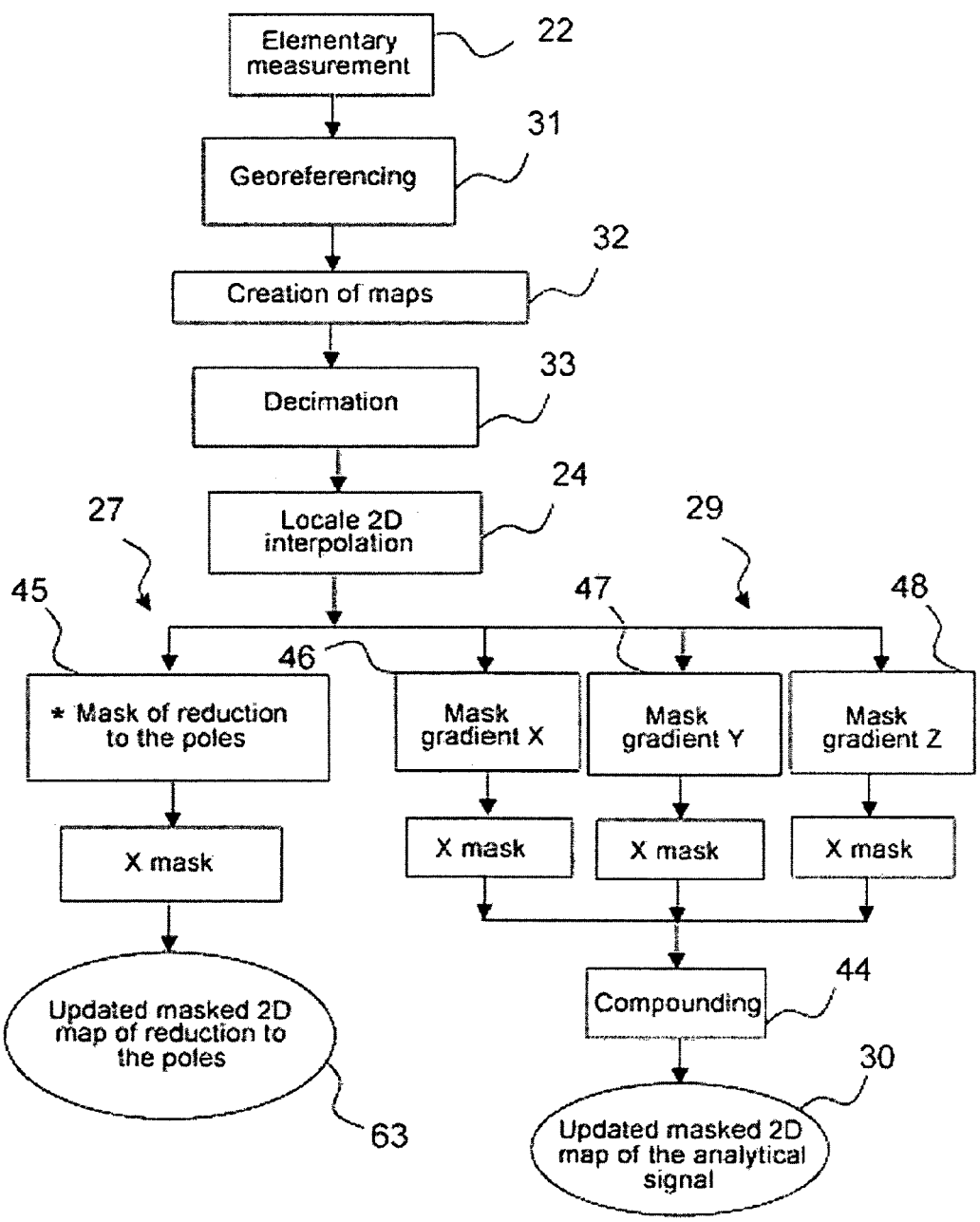
FIG. 5 is a representation of a method for acquiring and processing magnetometric data enabling local and in real time update of the 2D maps according to a first method.

The method for acquiring and processing magnetometric data includes a step of local and real-time updating of the map of magnetic anomalies by a step of elementary measuring 22 of the intensity of the magnetic field on a reduced geographic area, as represented on FIG. 5. An elementary series of magnetometric data associated with an updated pixel 23 is obtained.

The elementary series of magnetometric data corresponds to a sample of georeferenced measurements situated inside a single pixel. As soon as the pixel 23 is updated by the elementary series of magnetometric data, the different steps enabling to obtain the 2D maps are processed simultaneously.

The geographical position of each measurement is associated in real time to GPS data while taking the experimental and instrumental response times into account. The GPS data and the magnetometric data are dated with the same clock.

A step of creating maps 32 is applied to this georeferenced data while arranging said on a referenced map along the referentials x and y. This map exhibits a pitch which is 25 m in the following example. This map is updated as soon as a pixel is updated. If it is the first pixel, the map is created while being centred on the geographical position of this first pixel. It exhibits a default size of N×N points.

A step of spatial decimation 33 is applied is applied to these data adapted to the resolution of the map. It consists in ascribing a single intensity value and a single position for each pixel of the map. An updated map of magnetic anomalies 34 is obtained.

A step of local and real-time updating is applied to the 2D interpolation map 24 by applying the interpolation calculation 2D in the vicinity of the updated pixel 25, as represented on FIG. 6G).

To do so, the minimum curvature method has been modified.

For each of the 2D interpolation methods, variations have been developed to accelerate the processing time and be able to process large volumes of data.

In the method 1 ("resolution of a system of linear equations"), the surface to be interpolated is pre-gridded in sub-blocks which overlay one another partially. The algorithm determines in each sub-block the solution. In the covering zones the solution is obtained by linear combination des solutions of each sub-block.

Into the method 2 ("finite difference resolution"), as explained above, at the beginning of iterations, high frequencies can be obtained. The lowest ones are obtained at the end. For faster convergence, the idea thus consists in performing the process with several resolutions. The algorithm calculates a solution on the low resolution and uses this solution as starting point for the higher resolutions. Moreover the image is also gridded into sub-blocks which overlay one another partially (Webring M., 1981, MINC: A gridding program based on minimum curvature: U.S. Geological Survey Open-File Report p: 81-1224, 41).

For calculation of 2D interpolation, the method 2 modified is used preferably. The addition of a new point is essentially a local Modification. The algorithm searches for the solution locally while solving the equation to the finite differences by successive iterations in the vicinity of the updated pixel 25 (Smith W. H. F. and Wessel P., 1990, Gridding with continuous curvature splines in tension: *Geophysics*. 55, 293-305).

The operating mode is described below. The single parameter accessible by the user is the pitch of the map.

The first pixel received fixes the centre of the map whereof the default size is 1024×1024 for instance. For each new datum, the coordinate of the recipient pixel is calculated. If this pixel is not empty, its new value is updated by the method selected (nearest neighbour, average, . . . ). The global average of the field is also calculated gradually.

As soon as a pixel 23 is updated, the algorithm of the method 2 is applied in the vicinity 25 of this pixel for a number of iterations fixed beforehand Ni. The average value calculated acts as a starting value for the empty pixels. For this method, the size of the vicinity 25 varies during the iterations. At each iteration, the vicinity 25 is incremented by a fixed value L.

A convolution mask is applied to the pixels to be calculated, which may have, for instance, a size of 5×5 pixels.

L and Ni are both single parameters of the algorithm which ought to be adjusted in relation to the size of the map selected by the operator and also according to the size of the objects to be analysed (number of pixels). The greater the size of the objects, the more these parameters should be increased. A good estimate is of the order of Ni×L>2× size of the objects.

For instance, the values Ni=10 and L=10 provide good results for the examples represented on the Figures.

The algorithm converges more and more rapidly as the map is being formed, since at each new point, the algorithm starts from a surface which is already a good approximation of the solution, except for the first points.

If the calculation time is reasonable during the reconstruction of the high frequencies (25 ms for instance on a central unit fitted with a Pentium IV), it is optionally possible to make new iterations to improve reconstruction of the low frequencies.

The map is enlarged automatically as soon as a new measurement is situated outside a central zone of the map defined by a size of N/2×N/2 pixels.

The step of local and real-time updating of the 2D interpolation map may also be performed by any other type of local 2D interpolation method such as for instance the method of the closest neighbour, the polynomial interpolation method, or the spline method (spatial estimate and interpolation: Deterministic methods and geostatistic methods, Michel Arnaud and Xavier Emery, Hermes Science publications, Paris, 2000; Gridding of Geophysical Potential Fields from Noisy Scattered Data, Michael Rauth, Meteorology and geophysics institute of Vienna University, Thesis, 1998; Sambridge M., Braun J and McQueen H., 1995, Geophysical parameterisation and interpolation of irregular data using natural neighbours: *Geophysical J. International,* 122, 837-857; Akima H., 1970, A new method for interpolation and smooth curve fitting based on local procedures: *J. Association Computing Machinery:* 17, 589-602), without limitation thereto.

Updated pixels are thus obtained on an updated 2D interpolation map 26.

Then, a step of local and real-time updating of the 2D reduction map to the poles 27 is applied to the spatial frequencies made accessible by application to the updated 2D interpolation map 26 the reduction calculation to the poles for the updated pixel 23 and in the vicinity of said updated pixel 25. This step is represented on FIGS. 6 H) and 9.

Figure 7:
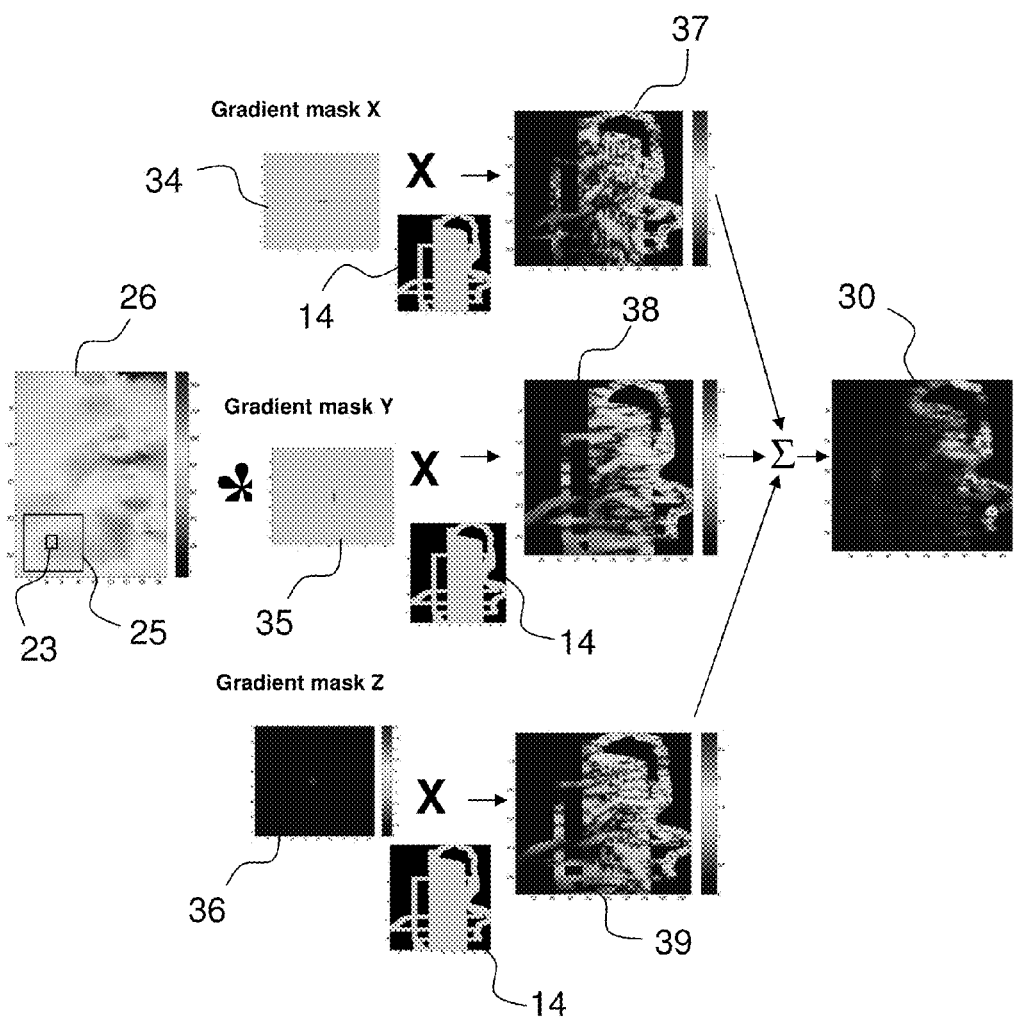
FIG. 7 is a representation of the different steps of a method for acquiring and processing magnetometric data enabling local and in real time update of the 2D maps of the analytical signal according to the first method.
Figure 10:
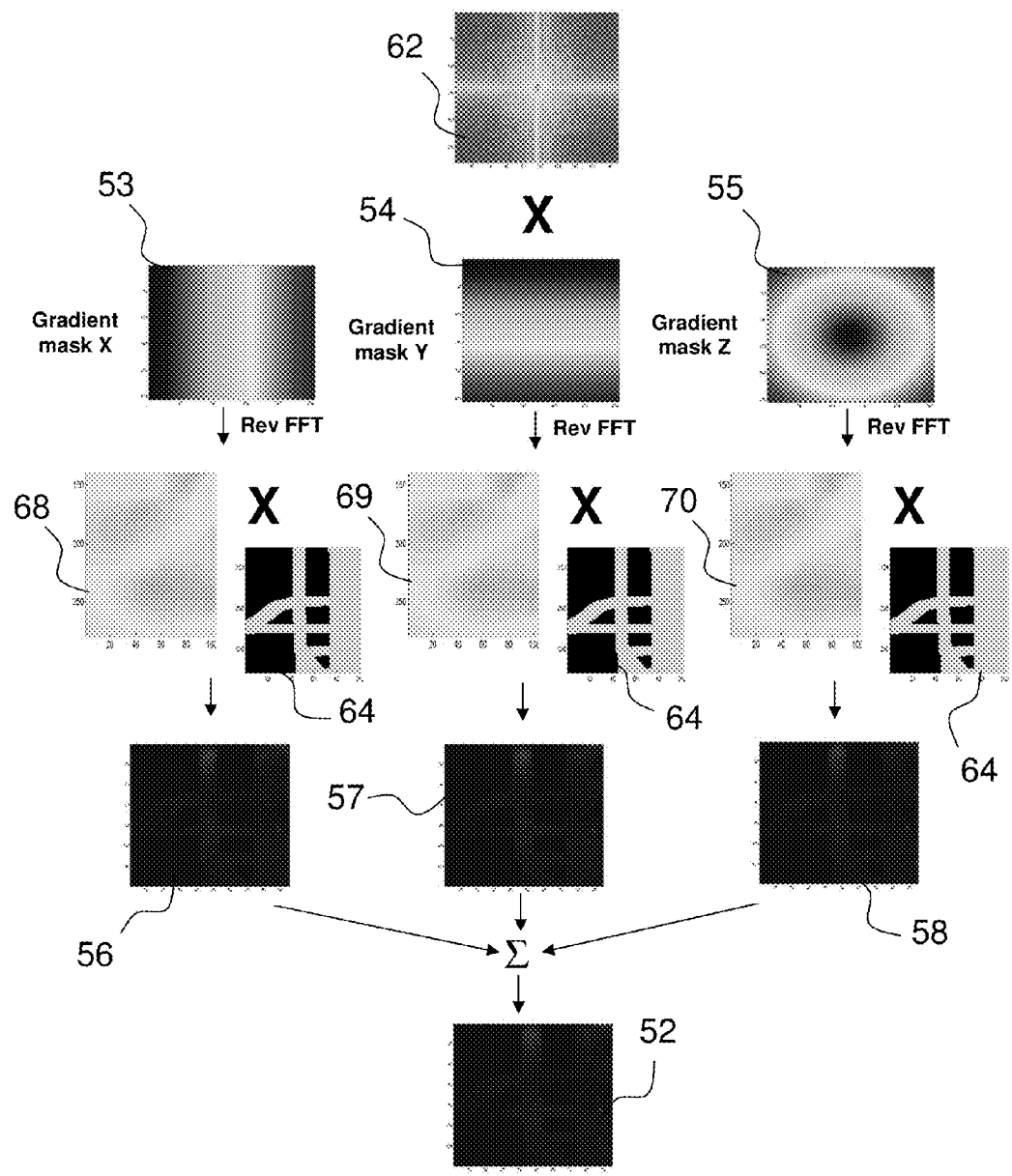
FIG. 10 is a representation of the different steps of a method for acquiring and processing magnetometric data enabling local and in real time update of the 2D maps of the analytical signal according to the second method.
Figure 11:
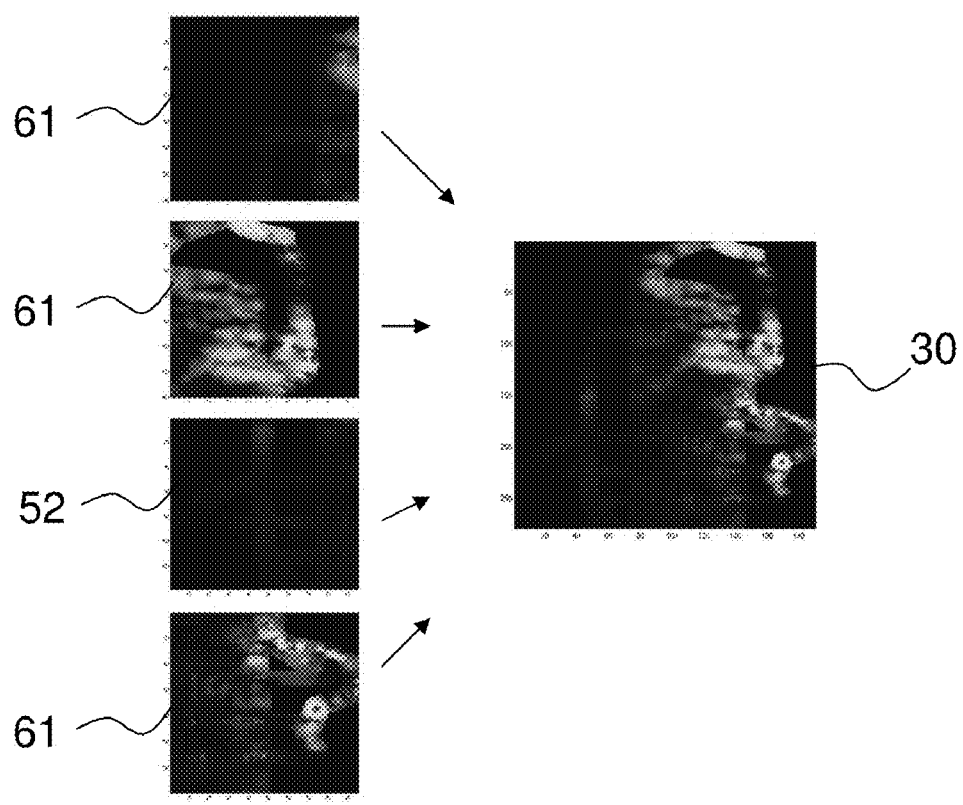
FIG. 11 is a representation of the last step (recombination) of the method for acquiring and processing magnetometric data enabling local and in real time update of the 2D maps of the analytical signal according to the second method.

A step of local and real-time updating of the 2D map of the analytical signal 29 is also applied by applying to the updated 2D interpolation map 26 the calculation of the analytical signal for the updated pixel 23 and in the vicinity of said updated pixel 25, as represented on FIGS. 7, 10 and 11.

The notion of spatial frequencies made accessible has been described above.

The dimension of the vicinity of the updated pixel 25 is variable according to the processing step.

For both these updating steps, two methods are possible.

The first method consists in applying a convolution mask in the spatial domain to the updated pixel 23 and in the vicinity of the updated pixel 25, to the non masked pixels of the updated 2D interpolation map 26. This operation is performed locally and in real time. The size of the vicinity 25 corresponds to twice the size of the convolution mask.

Figure 6:
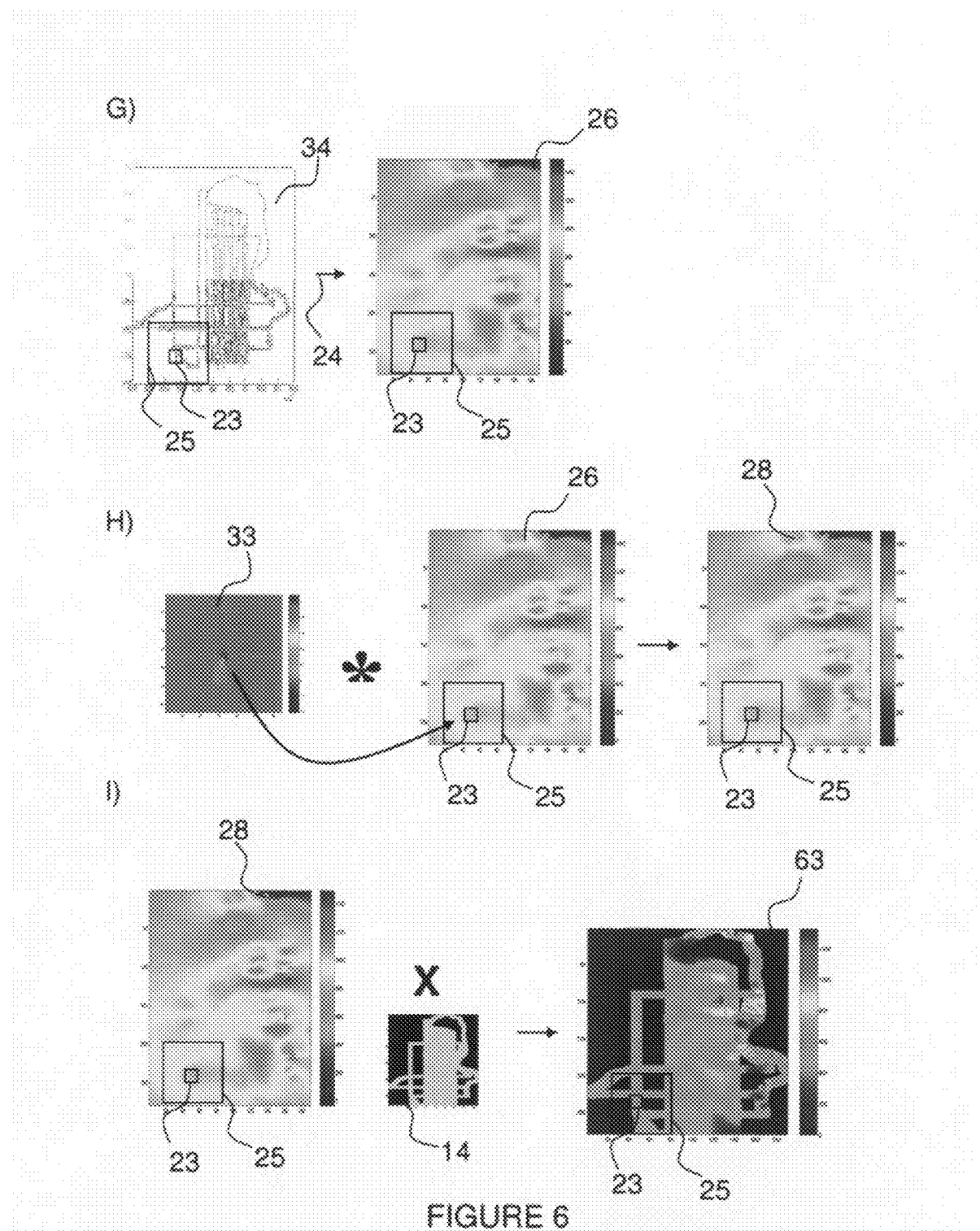
FIG. 6 is a representation of the different steps of a method for acquiring and processing magnetometric data enabling local and in real time update of the 2D maps of interpolation and reduction to the poles according to the first method.

Regarding the step of local and real-time updating of the 2D reduction map to the poles, a mask of reduction to the pole 33 is applied to the updated 2D interpolation map 26 as represented on FIG. 6 H) and according to the following formula:

$$B'(k,l) = \Sigma B(i,j) * M(k-i, l-j);$$

with:
B(i,j) representing the pixels of the updated 2D interpolation map 26;
B'(k,l) representing the pixels of the updated map of magnetometric data reduced to the poles 28;
and M(k−i,l−j) representing the mask of reduction to the pole.

Updated pixels are obtained on an updated map of magnetometric data reduced to the poles 28.

The result of FIG. 6 H) suggest that the reduction to the pole by convolution enables to reduce the "high" frequencies (frequencies made accessible) without discontinuity.

The updated map 28 of magnetometric data reduced to the poles the poles is then multiplied by the mask 14, obtained by the method represented on FIG. 3 D). An updated masked map 63 of magnetometric data reduced to the poles is thus obtained. This step is represented on FIG. 6 I).

On the Figures, the size of the masks, of the updated pixel 23 and of the vicinity of the updated pixel 25 are not true to scale for reasons of representation.

For the following filterings, the corresponding 2D convolution masks are obtained by reverse Fourier transform of the theoretical frequency responses FB(kx,ky), defined above. Their support is then limited. The function M1(i,j)=FFTinv (FB(kx,ky)) is obtained, with i=[1:N], j[1:N] and N representing the size of the support of the mask.

It is optionally possible to multiply the mask by an apodisation window.

The dimension of the mask is determined by the spatial extent of the filter. In case when the theoretical filter has a zero average, it is important to keep this property on the mask. The average value should hence be set to 0 if the theoretical average is equal to zero. The following mask M(i,j)=M1(i,j)−<M1(i,j)> is obtained.

The size of the support, whereon the mask of reduction to the pole 33 is applied, is N×N pixels, with N>64. In the example of FIG. 6 H), the size of the mask 33 is 64×64.

The size specified above is a minimum size. The selection of the size of the masks is also function of the sampling pitch of the anomaly map and of the size of the objects to be observed. If D is the max. size of the objects (the vicinity of the modified pixel 25) to be analysed and dX the sampling pitch of the map, N should also be selected such as N*dx>D.

Regarding the step of local and real-time updating of the 2D map of the analytical signal, a convolution mask of gradient X 34 then the mask 14 are applied to the updated 2D interpolation map 26 in the spatial domain. A filtered sub-image according to the referential X 37 is obtained, represented on FIG. 7.

A convolution mask of gradient Y 35 then the mask 14 are applied to the updated 2D interpolation map 26 in the spatial domain. A filtered sub-image according to the referential Y 38 is obtained.

A convolution mask of gradient Z 36 then the mask 14 are applied to the updated 2D interpolation map 26 in the spatial domain. A filtered sub-image according to the referential Z 39 is obtained.

These convolution masks 34, 35, 36 and the mask 14 are applied only once to each updated 2D interpolation map 26 so as to obtain three filtered sub-images 37, 38 and 39.

A step of compounding 44 is then applied to the three filtered sub-images 37, 38 and 39 so as to obtain pixels on an updated map of analytical magnetometric data 30.

The size of the support of the masks gradient X 34 and Y 35 is N×1 and 1×N respectively with N>32. The size of the support of the mask Gradient Z 36 is N×N with N>=11. In the example of FIG. 7, the size of the masks 34, 35, 36 is 64×64 pixels.

Figure 8:
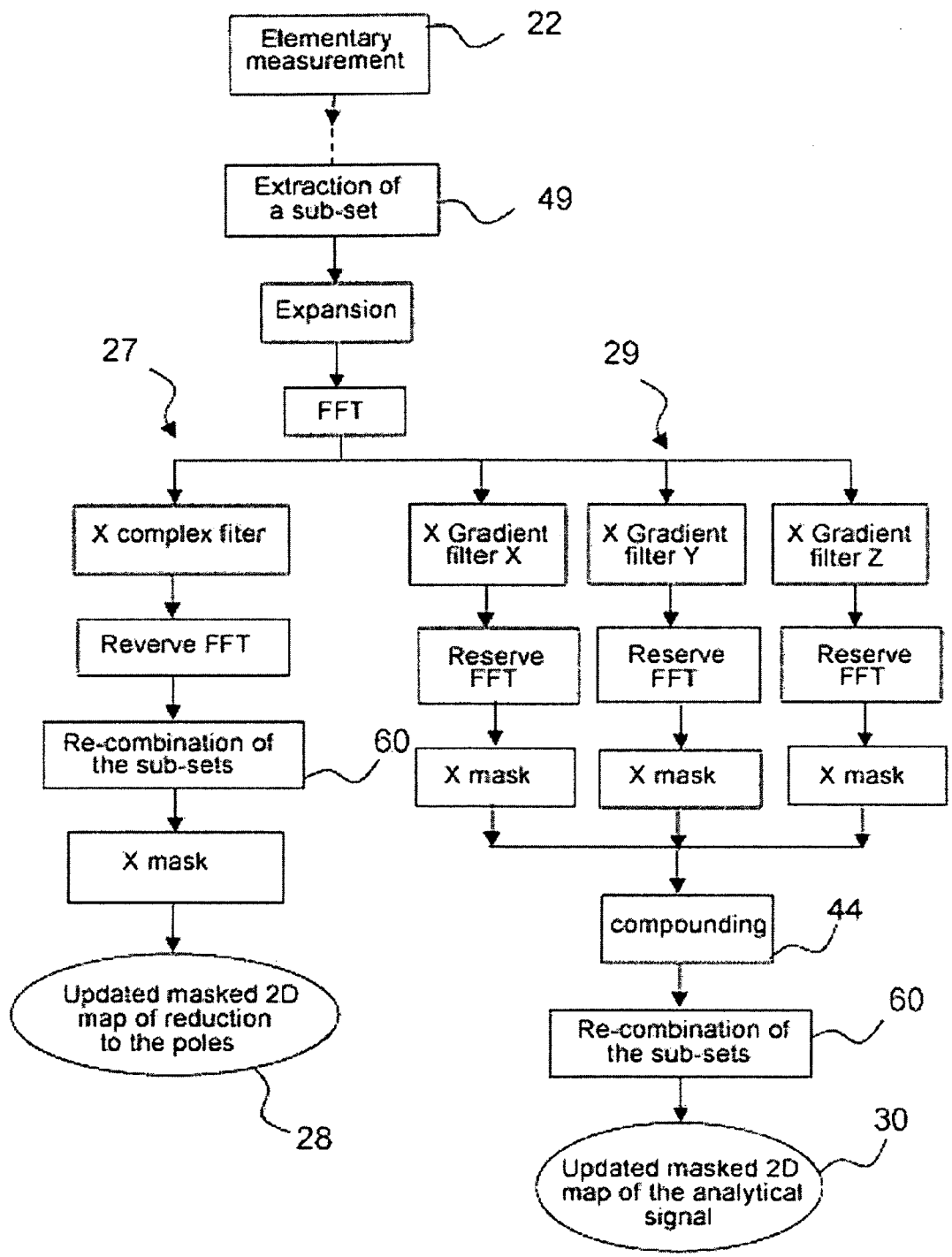
FIG. 8 is a representation of a method for acquiring and processing magnetometric data enabling local and in real time update of the 2D maps according to a second method.

The second method for updating the 2D maps, represented on FIG. 8, consists in extracting and processing sub-sets of the updated 2D interpolation map 26. The 2D interpolation map 26 is gridded as sub-sets of maximum size 1024×1024 for instance. This method enables processing large-sized maps.

It also enables to process these maps in real time. As soon as a new block of measuring points has been acquired and a pixel of the 2D interpolation map has been updated, a sub-set to be treated 50 of maximum size 1024×1024 pixels, centred on the updated pixel 23, is extracted then processed by Fourier filtering, as represented on FIG. 9 J). This extraction is also parameterised by a overlay factor between the sub-sets.

The sub-set to be treated 50 comprises the updated pixel 23 and the vicinity of said updated pixel 25. The size of the sub-set to be treated 50 corresponds to the size of the vicinity of the updated pixel 25.

The processing steps, below, enabling local and real-time updating operations, are applied solely to the sub-set to be treated 50.

An expansion operation is applied beforehand, described above, to the sub-set to be treated 50. This operation is followed by a calculation of two-dimensional Fourier transform. A sub-set to be treated is obtained in the Fourier domain 62.

A step of local and real-time updating of the 2D reduction map to the poles 27 is applied to the sub-set to be treated in the Fourier domain 62, as shown on FIG. 9K). This step is applied to the frequencies made accessible by the 2D interpolation calculation.

The step of local and real-time updating of the 2D map of reduction to the poles 27 comprises a multiplying operation by a complex filter 51, obtained by the method described above. This complex filter 51 is applied in the Fourier domain to the sub-set to be treated 50. This operation is followed by a two-dimensional reverse Fourier transform then a multiplication by a sub-mask 64 corresponding to a quarter of the mask 14 for the example of FIG. 9. More accurately, the sub-mask 64 corresponds to the zone represented by the sub-set to be treated 50. It is obtained by cutting and extracting this zone from the mask 14. A treated sub-set 52 is obtained. This treated sub-set 52 is masked.

A step of re-combining 60 of the treated sub-set 52 is applied with the remainder of the sub-assemblies 61 which are also masked. The updated map 28 of magnetometric data reduced to the poles is thus obtained.

Figure 9:
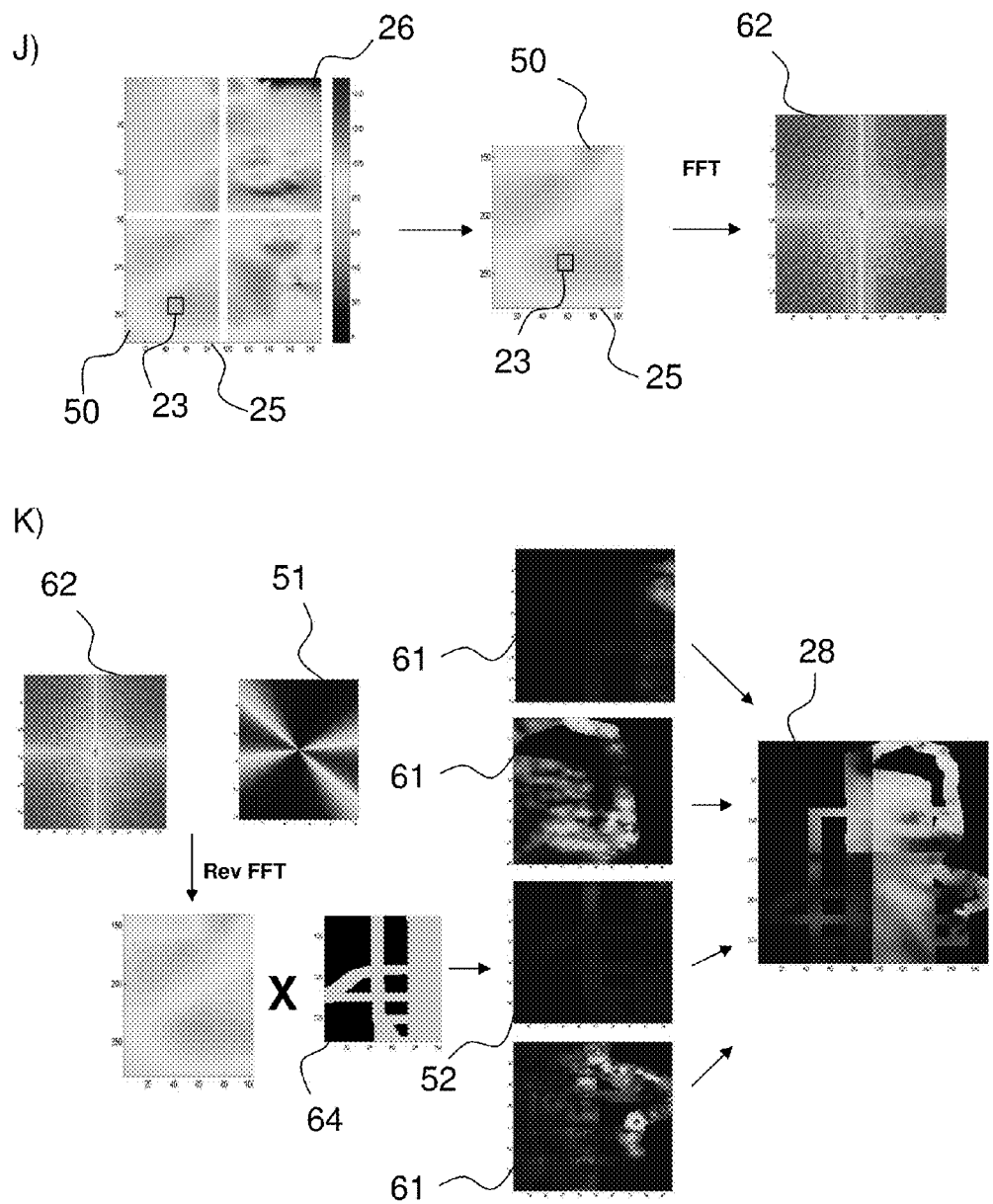
FIG. 9 is a representation of the different steps of a method for acquiring and processing magnetometric data enabling local and in real time update of the 2D maps of reduction to the poles according to the second method.

The result illustrated on FIG. 9 K) shows that there is a discontinuity between the levels of the sub-assemblies and that these discontinuities are not summed up to a constant shift of the levels. The reduction to the pole also alters a set of low frequencies.

Regarding the step of local and real-time updating of the 2D map of the analytical signal 29, represented on FIG. 10, it includes a multiplying operation by a gradient filter X 53, a multiplying operation by a gradient filter Y 54 and a multiplying operation by a gradient filter Z 55 applied in the Fourier domain to the sub-set to be treated 50. Each operation is applied alone so as to provide three maps in the Fourier domain.

Each multiplying operation is followed by a two-dimensional reverse Fourier transform treatment applied to each of these maps so as to obtain three maps in the spatial domain 68, 69, 70. These three maps in the spatial domain 68, 69, 70 are then multiplied by the sub-mask 64.

Three masked maps are obtained, one of gradient X 56, another of gradient Y 57 and the third of gradient Z 58.

These three maps 56, 57 and 58 are compounded so as to generate a single treated sub-set 52.

A step of re-combining 60 of the treated sub-set 52 is applied with the remainder of the sub-sets 61, as represented on FIG. 11. The 2D map of the updated analytical signal 30 is obtained.

This result shows that there is, in such a case, no discontinuity between the sub-images. This is due to the fact that the calculation of the analytical signal is a high-pass filter. Edge effects may appear if the overlaying factor is too small. This factor need not be significant (~10%). The maximum error is then smaller than 1%.

Regardless of the local updating method, a multi-resolution operation may be applied between the 2D interpolation step and one or the other of the steps of local and real-time updating of the 2D map of reduction to the poles 27 or of the 2D map of the analytical signal 29. Several maps with several resolutions are produced simultaneously so as to accelerate the convergence on the low frequencies.

It is also possible to apply a Euler deconvolution (Reid and al, 1990, Magnetic interpretation it three dimensions using Euler deconvolution, Geophysics, 55, p 80-91; M. F. Mushayandebvu, V. Lesur, A. B. Reid and J. D FairHead, Grid Euler Deconvolution with constraints for 2D structure, Geophysics, Vol 69, N°2, 2004, pp 489-496) on the updated 2D map of the analytical signal 30. This operation is performed locally for the updated pixel 23 and in the vicinity of said updated pixel 25 so as to enable the calculation of the index of the magnetic sources in real time. A recognition of "targets" in real time is thus provided.

This deconvolution also enables referencing the magnetic sources according to the referential z. The depth of the sources during measurements may then be assessed in real time.

These processes of magnetometric data may be associated with automaton controls.

For instance, they may control a red indicator signalling the presence of magnetic sources in real time on a boat.

The invention also relates to a device for acquiring and processing magnetometric data for at least two-dimensional map representation of magnetometric features of a geographic area.

It comprises a means for measuring magnetometric data which produces a signal forming a map of magnetic anomalies. It includes a unit for processing the signal producing a 2D map of reduction to the poles and a 2D map of the analytical signal.

According to the invention, the processing unit implements, locally and in real time, the method for acquiring and processing magnetometric data described above.

The means for measuring magnetometric data may be a magnetometric sensor capable of generating intensity magnetometric data B(s).

It may include several scalar sensors so as to measure the intensity gradient of the magnetic field according to one or several directions.

It may include a vectorial magnetometric sensor capable of generating vectorial magnetometric data Bx(s), By(s) and Bz(s) qui represent the three components of the magnetic field. These components enable to reconstruct the scalar signal B(s). Data processing may be simplified since it is possible to calculate directly gradient data from these components.

The means for measuring magnetometric data may be advantageously a gradiometer of the type of those which enable to generate directly gradient data of at least one of the components of the gradient tensor of the field Gx or Gy or Gz.

A gradiometer capable of generating gradient data of at least one of the components of the gradient tensor of the field Gx or Gy or Gz and also intensity magnetometric data B(s) may be used advantageously.

In a possible variation, a gradiometer capable of generating gradient data of at least one of the components of the gradient tensor of the field Gx or Gy or Gz and vectorial magnetometric data Bx(s), By(s) et Bz(s) may be used advantageously.

Obtaining directly, by the measuring means, gradient data enables to gain calculation time and accuracy on the data.

Thus, the invention offers a local method for acquiring and processing magnetometric data, which enables to analyse the results displayed on the 2D maps in real time, during the measuring campaign.

The invention ensures considerable gain in time and a reaction on the field in real time. A container or a mine off-shore may be localised and withdrawn immediately.

The invention claimed is:

1. A method for acquiring and processing magnetometric data for at least two-dimensional map representation of magnetometric features of a geographic area including:
   a step of measuring an intensity of a magnetic field on a geographic area producing a set of intensity magnetometric data B(s) as a survey forming a map of magnetic anomalies, s representing a curvilinear abscissa along a trajectory of the survey;
   a step of 2D-interpolation calculation applied to the set of intensity magnetometric data B(s) producing a set of intensity magnetometric data B(x,y) referred to according to referentials x and y on a 2D interpolation map;
   a step of calculating a reduction to poles applied to the set of interpolated intensity magnetometric data B(x,y) producing a set of magnetometric data reduced to the poles B'(x,y) represented on a 2D reduction map of the poles;
   a step of calculating an analytical signal applied to the set of interpolated intensity magnetometric data producing a set of analytical magnetometric data represented on a 2D map of the analytical signal gridding the map of magnetic anomalies into a matrix of pixels;
   a step of local and real-time updating of the map of magnetic anomalies by an elementary measuring step of the intensity of the magnetic field on a reduced geographic area producing an elementary series of magnetometric data associated with an updated pixel;
   a step of local and real-time updating of the 2D interpolation map by applying the 2D interpolation calculation in a vicinity of the updated pixel, producing pixels on an updated 2D interpolation map;
   a step of local and real-time updating of the 2D reduction map to the poles by application to the updated 2D interpolation map of the reduction calculation to the poles for the updated pixel and in the vicinity of said updated pixel , producing pixels on an updated map of magnetometric data reduced to the poles; and
   a step of local and real-time updating of the 2D map of the analytical signal by application to the updated 2D interpolation map of the calculation of the analytical signal for the updated pixel and in the vicinity of said updated pixel, producing pixels on an updated map of analytical magnetometric data.

2. The method for acquiring and processing magnetometric data according to claim 1, wherein the step of local and real-time updating of the 2D interpolation map includes a calculation of minimal curvature type.

3. The method for acquiring and processing magnetometric data according to claim 1, wherein the step of local and real-time updating of the 2D reduction map to the poles includes a step of applying a convolution mask in a spatial domain.

4. The method for acquiring and processing magnetometric data according to claim 1, wherein the step of local and real-time updating of the 2D map of the analytical signal includes:
   a step of applying a gradient convolution mask X in a spatial domain producing a filtered sub-image according to referential X,
   a step of applying a gradient convolution mask Y in the spatial domain producing a filtered sub-image according to referential Y,
   a step of applying a gradient convolution mask Z in the spatial domain producing a filtered sub-image according to referential Z,
   a step of compounding filtered sub-images according to the referentials X, Y and Z.

5. The method for acquiring and processing magnetometric data according to claim 1, further including a step of extracting a sub-set to be treated of the updated 2D interpolation map, the sub-set to be treated comprising the updated pixel and the vicinity of said updated pixel.

6. The method for acquiring and processing magnetometric data according to claim 5, wherein the steps of local and real-time updating of the 2D reduction map to the poles and of the 2D map of the analytical signal are applied solely to the sub-set to be treated.

7. The method for acquiring and processing magnetometric data according to claim 6, wherein the step of local and real-time updating of the 2D reduction map to the poles includes a multiplying operation by a complex filter applied in a Fourier domain to the sub-set to be treated generating a treated sub-set.

8. The method for acquiring and processing magnetometric data according to claim 6, wherein:
   the step of local and real-time updating of the 2D map of the analytical signal includes a multiplying operation by a gradient filter X, a multiplying operation by a gradient filter Y, a multiplying operation by a gradient filter Z applied in the Fourier domain to the sub-set to be treated , wherein each multiplying operation is applied alone so as to provide three maps, one of gradient X, another of gradient Y, and a third of gradient Z,
   the three maps are compounded so as to generate a single treated sub-set.

9. The method for acquiring and processing magnetometric data according to claim 7, wherein the steps of local and real-time updating of the 2D reduction map to the poles and of the 2D map of the analytical signal include a step of re-combining the treated sub-set with a remainder of the sub-sets.

10. The method for acquiring and processing magnetometric data according to claim 1, wherein a Euler deconvolution is applied, locally and in real time, to the updated pixel and in the vicinity of said updated pixel on the 2D map of the updated analytical signal so as to enable referencing magnetic sources according to a referential z.

11. The method for acquiring and processing magnetometric data according to claim 1, wherein a Euler deconvolution is applied, locally and in real time, to the updated pixel and in the vicinity of said updated pixel on the 2D map of the updated analytical signal so as to enable calculating an index of magnetic sources generating the pixels of analytical magnetometric data.

12. A device for acquiring and processing magnetometric data for the production of a map with at least two-dimensional representation of magnetometric features of a geographic area comprising:
　a means for measuring magnetometric data producing a signal forming a map of magnetic anomalies;
　a processing unit for processing said signal producing a 2D reduction map of poles and a 2D map of an analytical signal,
　wherein the processing unit is configured for, locally and in real time, acquiring and processing said magnetometric data for said two-dimensional map representation of magnetometric features of the geographic area,
　said processing unit configured for measuring an intensity of a magnetic field on a geographic area producing a set of intensity magnetometric data B(s) as a survey forming the map of magnetic anomalies, s representing a curvilinear abscissa along a trajectory of the survey;
　said processing unit configured for performing a 2D-interpolation calculation applied to the set of intensity magnetometric data B(s) producing a set of intensity magnetometric data B(x,y) referred to according to referentials x and y on a 2D interpolation map;
　said processing unit configured for calculating a reduction to poles applied to the set of interpolated intensity magnetometric data B(x,y) producing a set of magnetometric data reduced to the poles B'(x,y) represented on the 2D reduction map of the poles;
　said processing unit configured for calculating an analytical signal applied to the set of interpolated intensity magnetometric data producing a set of analytical magnetometric data represented on a 2D map of the analytical signal gridding the map of magnetic anomalies into a matrix of pixels;
　said processing unit configured for local and real-time updating of the map of magnetic anomalies by an elementary measuring step of the intensity of the magnetic field on a reduced geographic area producing an elementary series of magnetometric data associated with an updated pixel;
　said processing unit configured for local and real-time updating of the 2D interpolation map by applying the 2D interpolation calculation in a vicinity of the updated pixel, producing pixels on an updated 2D interpolation map;
　said processing unit configured for local and real-time updating of the 2D reduction map to the poles by application to the updated 2D interpolation map of the reduction calculation to the poles for the updated pixel and in the vicinity of said updated pixel, producing pixels on an updated map of magnetometric data reduced to the poles; and
　said processing unit configured for local and real-time updating of the 2D map of the analytical signal by application to the updated 2D interpolation map of the calculation of the analytical signal for the updated pixel and in the vicinity of said updated pixel, producing pixels on an updated map of analytical magnetometric data.

13. The device for acquiring and processing magnetometric data according to claim 12, wherein the means for measuring magnetometric data includes at least one scalar magnetometric sensor.

14. The device for acquiring and processing magnetometric data according to claim 12, wherein the means for measuring magnetometric data is a vectorial magnetometric sensor capable of generating vectorial magnetometric data Bx(s), By(s) and Bz(s), Bx(s), By(s) and Bz(s) being three components of the magnetic field B(s).

15. The device for acquiring and processing magnetometric data according to claim 12, wherein the means for measuring magnetometric data is a gradiometer capable of generating gradient data of at least one of components of a gradient tensor of field Gx or Gy or Gz.

16. The device for acquiring and processing magnetometric data according to claim 15, wherein the means for measuring magnetometric data is a gradiometer capable of generating gradient data of at least one of the components of the gradient tensor of the field Gx or Gy or Gz and intensity magnetometric data B(s).

17. The device for acquiring and processing magnetometric data according to claim 15, wherein the means for measuring magnetometric data is a gradiometer capable of generating gradient data of at least one of the components of the gradient tensor of the field Gx or Gy or Gz and vectorial magnetometric data Bx(s), By(s) and Bz(s).

18. The method for acquiring and processing magnetometric data according to claim 2, wherein the step of local and real-time updating of the 2D reduction map of the poles includes a step of applying a convolution mask in a spatial domain.

19. The method for acquiring and processing magnetometric data according to claim 2, wherein the step of local and real-time updating of the 2D map of the analytical signal includes:
　a step of applying a gradient convolution mask X in a spatial domain producing a filtered sub-image according to referential X;
　a step of applying a gradient convolution mask Y in the spatial domain producing a filtered sub-image according to referential Y;
　a step of applying a gradient convolution mask Z in the spatial domain producing a filtered sub-image according to referential Z; and
　a step of compounding filtered sub-images according to the referentials X, Y and Z.

20. The method for acquiring and processing magnetometric data according to claim 2, further including a step of extracting a sub-set to be treated of the updated 2D interpolation map, the sub-set to be treated comprising the updated pixel and the vicinity of said updated pixel.

* * * * *